Patented Feb. 4, 1941

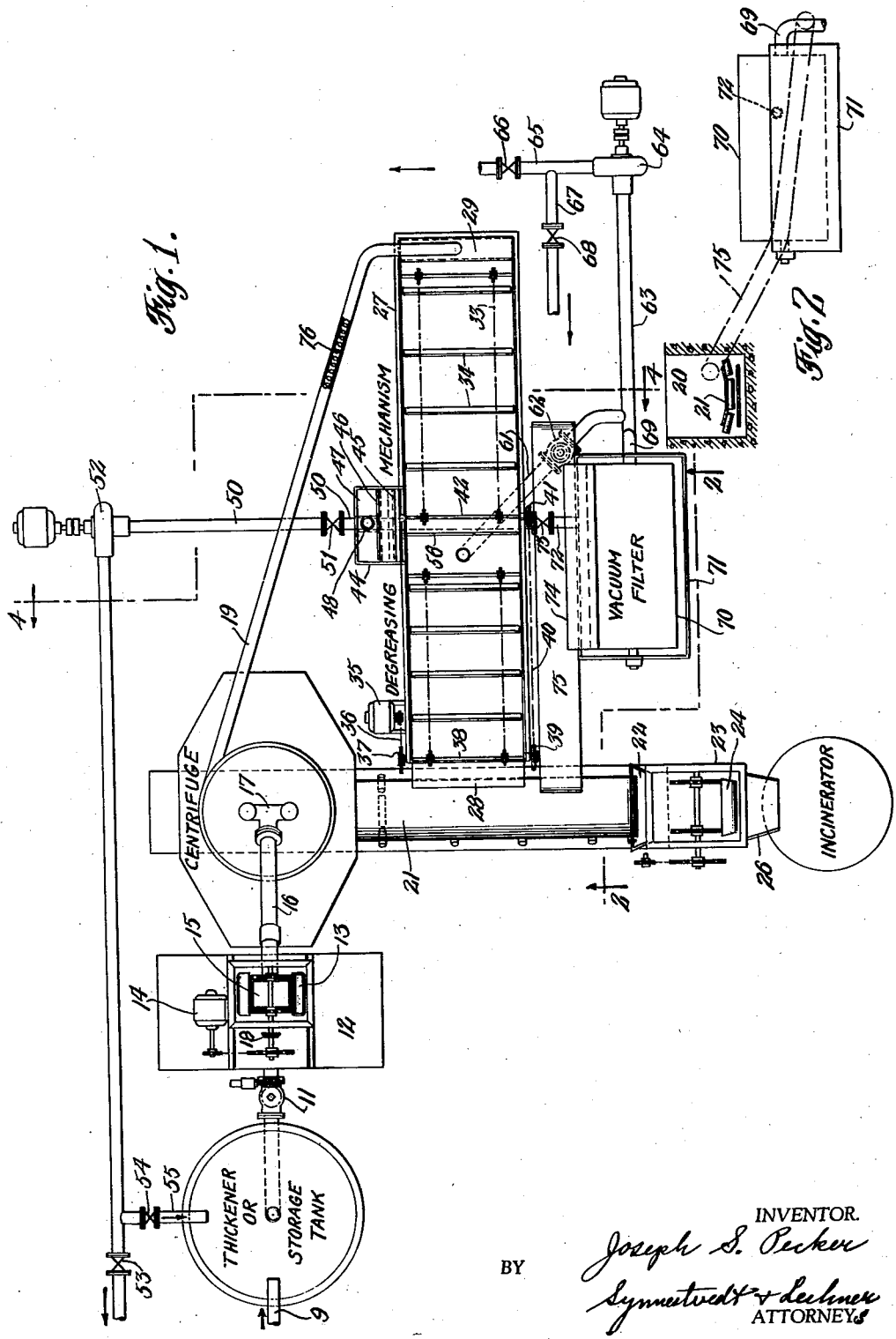

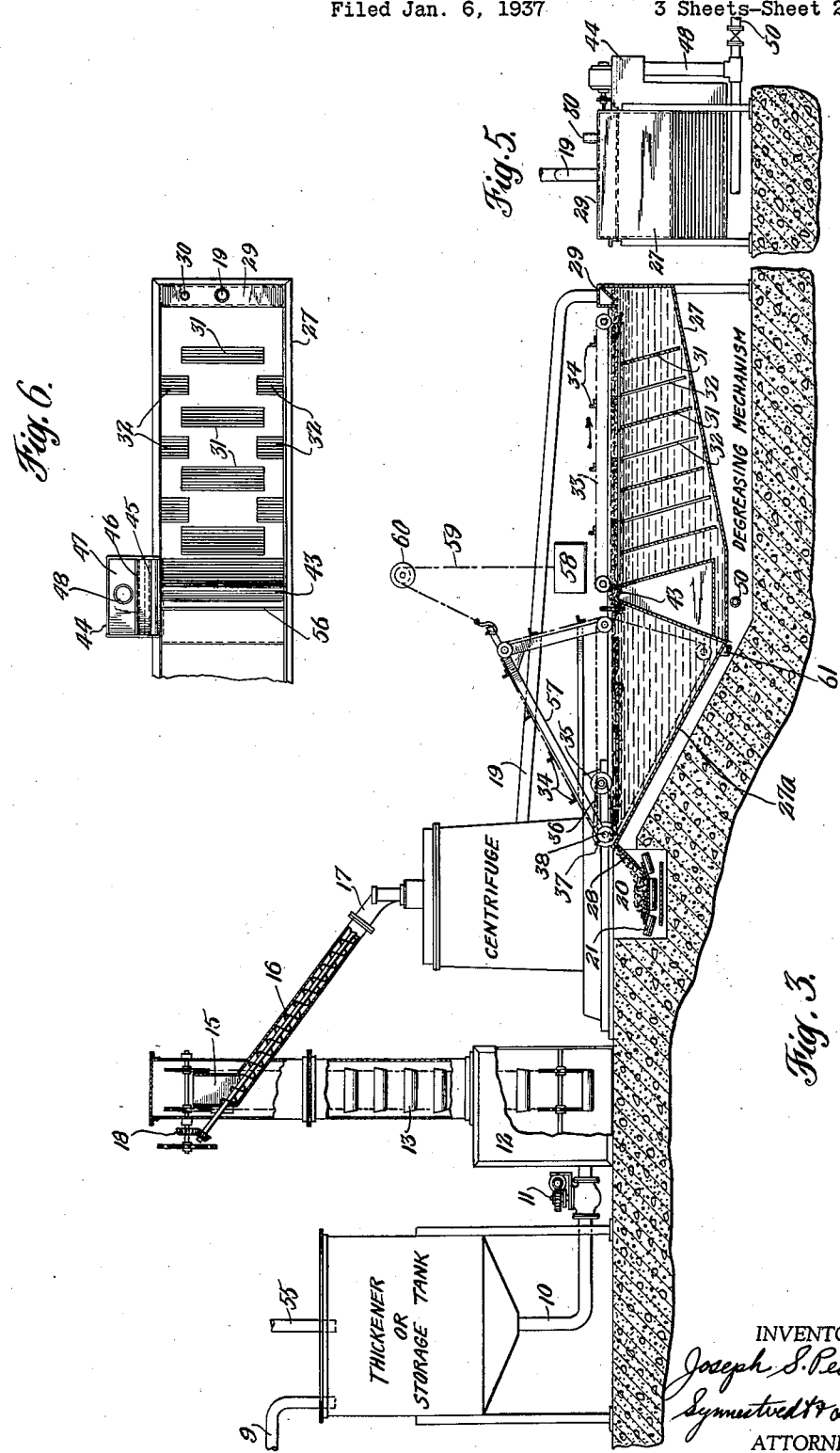

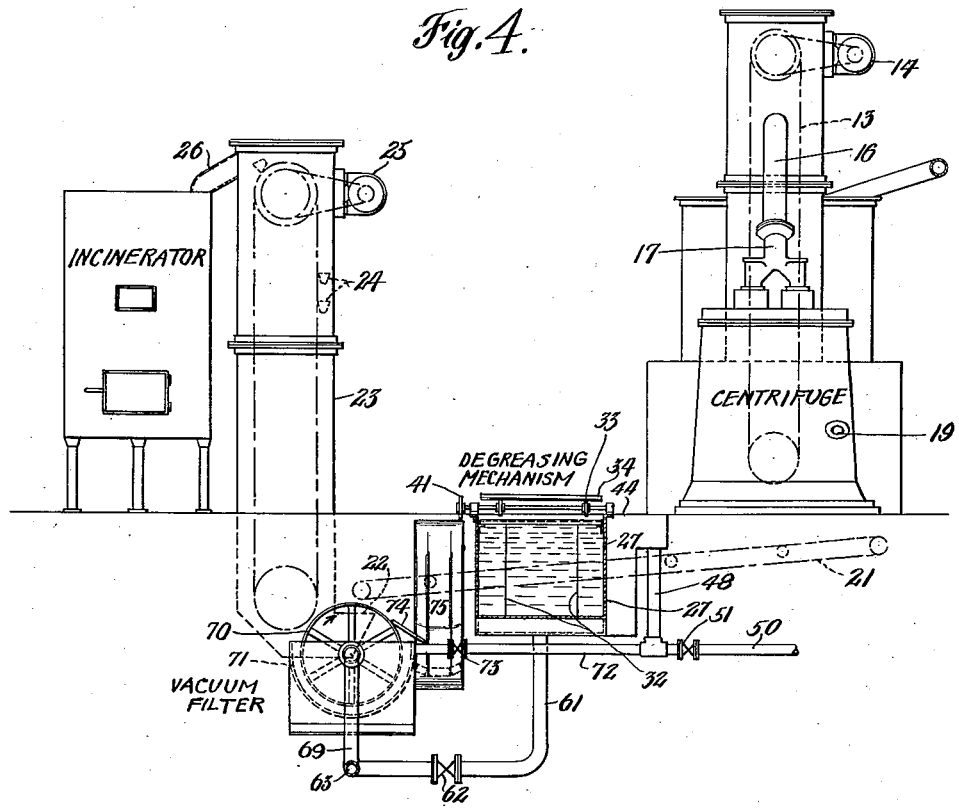

2,230,385

UNITED STATES PATENT OFFICE 2,230,385

METHOD AND APPARATUS FOR TREATING SEWAGE SLUDGES AND THE LIKE

Joseph S. Pecker, Philadelphia, Pa., assignor to American Centrifugal Corporation, New York, N. Y., a corporation of Delaware Application January 6, 1937, Serial No. 119,232

6 Claims. (Cl. 210—2)

This invention relates to methods and apparatus for treating sewage sludges and the like, and especially to the extraction of greases from such sludges and the disposal of the various separated components of such sludges. The nature, objects and advantages of the present invention will be best understood after a brief statement of some of the problems in this art.

Both domestic and industrial wastes as they enter the usual sewage system have a very high grease content, it being found that the sludges, which are customarily derived from the raw sewage by means of gravity settling tanks, contain greases in amounts sometimes as high as fifteen percent of the total non-watery ingredients of the sludge. In the secondary stages of the average sewage treatment plant, i. e., the stages following the precipitation in the settling tanks of the major portion of the sludges and entrained greases, the greasy components of the sludge constitute a very troublesome factor in the proper operation of the later stages of the plant and/or in the ultimate disposition of the materials as they leave the plant.

For instance, if the sludges be dewatered by means of vacuum filtration mechanism, the greases present tend to clog the filtering medium, such as filter cloths, particularly in the case of undigested sludges, and thus retard the vacuum filtration action of the mechanism, and reduce the output and efficiency of operation of the plant. Similarly, if the secondary stages of the plant are of the sludge digestion type followed by final drying of the sludges on sand or other gravity filter beds, the greases retard the action of the digestion tanks and also the drying of the sludge on the filter beds.

Still further, if the liquids from either a vacuum filter or a digestion tank are returned to the primary stages of the plant, i. e., the usual settling and aeration tanks, the grease content in said tanks tends to build up and to prevent the sedimentation action in the settling tanks and/or the bacteriological flocculation in the aeration tank. It also interferes with or retards the action of chemicals sometimes employed to precipitate or coagulate the sludges.

Finally, such portion of the greases as is carried off with the liquids from the various stages of the plant and thus discharged into streams or other bodies of water, even though the body of water be large enough to provide ample dilution, tends to float upon the surface producing noxious vapors and unpleasant odors, and/or to collect along the shores or banks of the stream.

In addition to all of the foregoing, the failure to extract the greases in the process of sewage treatment and disposal results in substantial losses, since such greases have a high calorific value and could be put to use as a valuable fuel.

The present invention has as its primary purpose the overcoming of the foregoing difficulties and disadvantages, and in general the extraction of a large percentage of the grease content of sewage, sewage sludges, and like materia's, thus improving the operation of the sewage disposal plant in many ways and making it possible to employ the greases for useful purposes.

Further, the invention contemplates improved methods and means for extracting greases from sewage sludges and the like, coordinated in a novel manner with centrifugal sludge dewatering mechanism, or with vacuum filtration mechanism, or with both, in such a way as to improve the operation of such mechanism itself in addition to improving the operation of other stages or phases of the disposal plant; and further the coordination of the dewatering mechanism and the degreasing mechanism, and a unification of the use or disposal of the separated solids and greases, as by a joint incineration of the two.

More particularly, the invention contemplates a sewage disposal system in which, following the settling of the sludges out of the raw sewage, the sludges are collected and/or thickened by storage and are fed, preferably automatically, in measured quantities at predetermined rates to one or more centrifuges or the equivalent, from whence the dewatered sludges are carried, as by an endless conveyor system, to a suitable incinerator or other point of use or disposal. Further according to a preferred embodiment of the invention, the effluent from the centrifugal separating mechanism is delivered, preferably while still in an aerated condition (due to the agitation thereof by said mechanism and/or by a separate agitator or aerator) into a tank or the like, wherein mechanical separation of the greases from said effluent is effected, the greases being delivered thence to said conveying system, and the remaining liquids with their suspended fine solids being taken off either to a stream or other body of water, or for return to the primary stages of the disposal plant, or to the sludge storage tank, and thence again to the centrifuge.

The invention further provides, as an alternative, for the withdrawal of the liquids from the degreasing tank and the delivery thereof to a further stage of rotary separating equipment, such as a vacuum filter, from which most of the remaining fine solids, with any entrained greases, may be conducted to the aforesaid conveying system, and the final clarified liquid or effluent may be returned either to one stage or another of the plant to be again passed therethrough or may be discharged to the stream.

Still further, the invention contemplates improvements in the degreasing mechanism itself, including among other things the separation of the greases from the liquids in a plurality of stages, and the drawing off of the liquids, if desired, separately as to the several stages, the final stage of liquid discharge being preferably to a stream or to one of the earlier stages of the plant.

Other objects and advantages of the invention and features of the process as well as of the apparatus will appear from the appended description of a preferred installation, which is illustrated in the accompanying drawings.

Figure 1 illustrates more or less diagrammatically, in plan view, a sludge handling and disposal system, including a thickener or storage tank, a centrifuge, the degreasing mechanism of the present invention, a vacuum filter, and an incinerator, together with elevating, conveying, piping and pumping equipment and other parts;

Figure 2 is a diagrammatic elevation of the vacuum filter and of the associated conveying mechanism, and with the primary conveyor shown in section, (the view being taken approximately on the line 2—2 of Figure 1);

Figure 3 is a vertical longitudinal section through portions of the system, particularly the degreasing mechanism and conveyor (showing certain parts of said mechanism omitted from Figure 1), and showing other portions of the system in elevation, with parts broken away and other parts in section;

Figure 4 is a view chiefly in elevation, but in section through the degreasing mechanism, taken approximately on the line 4—4 of Figure 1;

Figure 5 is an end elevational view of the degreasing mechanism, taken from the right of Figure 3;

Figure 6 is a fragmentary plan view of the degreasing mechanism of Figure 3, omitting certain of the associated parts, but illustrating in detail the tank and baffle structure;

Figure 7 is a fragmentary view, on a larger scale, of the central portion of the degreasing mechanism as seen in Figure 3; and Figure 8 is a transverse section through the degreasing mechanism, taken about on the line 8—8 of Figure 7.

By reference first to the general views, Figures 1, 3 and 4, it will be seen that the sludge, which as before stated is preferably separated from the raw sewage by means of gravity settling tanks, which need not here be shown, enters the thickener or storage tank as by a pipe or conduit 9, from whence it is delivered through a pipe 10 by means of an automatic valve device 11 into a base compartment 12 of a bucket elevator 13, the latter being driven as by an electric motor 14 to deliver the sludge into a chute 15, from whence it is fed by gravity or more preferably by a positively controlled feeding device such as a screw conveyor 16 into the inlet or feed pipe 17 of the centrifuge. It will be observed that the driving of the feeding device 16 is coordinated with the action of the bucket elevator 13, as by means of the bevel gearing shown at 18, whereby the volume or charge in the compartment 12 of the elevator which is determined by the automatic timing of the valve 11, may be fed to the centrifuge at a predetermined fixed or variable rate bearing a predetermined relation to the cycle of operation of the centrifuge.

The control of the operation of the automatic valve 11 and of the centrifuge 17 is also preferably automatically coordinated, but the mechanism for this purpose need not be shown as the same is described and claimed in my copending application Serial No. 759,302 filed December 26, 1934.

Though not essentially so, the centrifuge is preferably of the continuous cyclically operating type, an example of which is illustrated in my U. S. Patent No. 2,056,885 issued October 6, 1936, wherein the sludge is simultaneously fed and centrifuged for a predetermined period, the effluent being carried off through a pipe, indicated herein at 19, the dried sludge or cake being thereafter automatically scraped or cleaned out of the machine and discharged at the bottom into a well or the like, indicated herein at 20, this cycle being continuously repeated. By a centrifuge of such character, the sludge may be dried to a point where it will support its own combustion.

According to the present invention, the dried sludge, as it is discharged from the bottom of the centrifuge, falls upon a conveyor belt 21, which conducts the same to the boot 22 of a bucket elevator 23, the buckets 24 of which are driven as by a motor 25 and deliver the material to a chute or spout 26 discharging into the incinerator (diagrammatically shown).

The effluent leaving the centrifuge through the pipe 19 is composed largely of water and greases with a small amount of fine solids, since, during the centrifuging operation, the heavier solids separate centrifugally outwards, forcing the water and the lighter greases inwardly from whence they are discharged through passages within the machine into the effluent discharge pipe 19. Thus, the centrifuge removes most of the solids from the sludge and delivers them directly to the conveyor leading to the incinerator or other point of use, and the water and greases are taken off for subsequent separation. The pipe 19 leads this effluent mixture into the tank 27 of the degreasing mechanism, adjacent one end thereof.

Before describing the details of the improved degreasing mechanism itself, the broader phases of this portion of the invention will first be treated of, since the broader aspects of the system as a whole are not limited to a particular type of degreaser.

Considered broadly, the greases from the degreasing mechanism are discharged, as by a plate 28, on to the conveyor belt 21, and are thus fed, along with the solids from the centrifuge, into the incinerator, wherein, because of their high calorific value, they aid in burning the solids, especially in cases where the centrifuging or other sludge drying mechanism employed does not dry the solids to the point where they will support their own combustion. The bucket elevator or other conveying equipment may be utilized to more or less mix the greases and the solids, thus recombining these two components of the original sludge, and the incineration of these elements may be used to generate heat or power, in accordance with my copending application Serial No. 119,232 filed January 6, 1937.

Returning now to the preferred structure of the degreasing mechanism itself, it will be seen that the pipe 19 delivers the centrifuge effluent into the tank 27 through a baffle box 29, having a discharge aperture, as shown, extending crosswise of the tank 27 slightly beneath the normal water level, which serves to spread the incoming effluent across the full width of the tank and also tends to avoid excessive agitation of the contents of the tank. An air vent may be provided at 30, in the top of the box 29 (see Figs. 5 and 6). The tank 27 is preferably provided with a plurality of baffles 31, 32 (Figs. 3 and 6), arranged in staggered relation as shown and inclined upwardly and forwardly in the direction of travel of the contents of the tank, so that the heavier liquids, chiefly water, must take a sinuous path in their horizontal traverse, the lighter greases, oils, etc. tending to rise, not only by virtue of their lighter specific gravity but also by virtue of the inclination of the baffles. At the top of the tank is a belt or chain conveyor or skimmer, shown diagrammatically at 33, having thereon any suitable means for dragging the greases along the surface of the water, such as ordinary angle bars 34. The upper pass of this grease skimming mechanism travels rearwardly as shown by the arrow in Figure 3, and the lower pass travels forwardly lengthwise of the tank with the angle bars just about submerged in the grease and sliding upon the fixed longitudinal angle irons 34a. This mechanism may be driven in any suitable manner (for example, as shown in Figure 1) as by a motor 35, belt 36, pulley 37, shaft 38, pulley 39, belt 40, pulley 41 and shaft 42, or by other suitable means.

The grease is carried by the bars 34 slightly upwardly and over the edge of the arcuate plate 43, which may be struck on an arc substantially concentric with the sprockets or the like of the skimmer, the upper edge of said plate being slightly above the liquid level. The liquid level is determined by means of a hydrostatic water discharge device indicated generally at 44 in Figures 5 and 6.

The details of the water take-off are shown in Figure 8 and comprise a conduit of long and narrow cross section, shown at 45 in Figures 1 and 8, which opens with a flaring mouth adjacent the very bottom of tank 27, at one side of the latter and delivers at the top over an adjustable plate or gate 46 into a take-off compartment 47, which latter has an outlet pipe 48. By means of the threaded bolts or other adjusting devices 49, the height of the top of the plate 46 may be adjusted and thus the liquid level in tank 27 may be regulated with respect to the skimmer mechanism.

The settled liquid, taken off from degreasing tank 27 by the mechanism just described may be delivered through piping 50 and valve 51, under the influence of motor driven pump 52, either to a point of final discharge, such as an available stream of water, by way of another valve 53, or back into some stage of the treatment plant, such as the thickener tank, by way of valve 54 and pipe 55. The installation may comprise just the portion of the degreasing mechanism above described. However, for further separation and a more refined operation of the plant, the degreasing mechanism may include also the apparatus now to be described, as follows:

The grease may be discharged over the plate 43 into a secondary tank section 27a (Figure 7) a suitable baffle plate 56 being provided to minimize agitation of the materials in the second tank or compartment. For this tank section, there is also provided a skimmer mechanism comprising skimmer bars 34, similar to that in the primary skimming tank, the direction of travel of the skimmer being shown by an arrow in Figure 7 but this skimmer preferably travels in a triangular path about sprockets or the like mounted in a three-cornered frame structure 57 which is pivoted about a horizontal axis preferably coinciding with the axis of the skimmer driving shaft 38, so that the mechanism may be used either as a skimmer (when in the raised position shown in full lines in Figures 3 and 7) or as a scraper for cleaning out materials which may collect on the sloping bottom of the tank structure 27a (when in the lowered position shown in dotted lines in Figure 3); any suitable means being provided for raising and lowering the frame 57, such as a counterbalance weight 58 having a cable 59 passing over a pulley 60, which renders the frame easily moved up and down by hand. This skimmer mechanism may be separately driven, but is preferably driven in coordination with the primary skimmer 33, by means of the same motor 35, acting through belt 36, pulley 37, shaft 38, and the sprockets shown thereon.

By the action of the progressing travel of the skimmer bars 34, and the converging slope of the floor of the secondary tank 27a, the greases are further concentrated, and the water further separated out by downward flow to the water outlet pipe 61, so that the greases as they pass over the edge and downwardly on the spreader plate 28 (Figure 3) are sufficiently concentrated to burn readily.

Discharge pipe 61 leading from the secondary degreasing tank is provided with a valve 62 to regulate the connection of said pipe 61 to a take off line 63 in which a suction pump 64 (Figure 1) is located, acting to deliver the discharge either to a suitable stream through pipe 65 and valve 66 or back into some stage of the system, such as the storage tank by way of pipe 67 and valve 68.

Whether the foregoing or some other type of degreasing equipment is used, the invention contemplates (as an alternative, or as a supplement, to the centrifuge) the employment of vacuum filtration mechanism in coordinated relationship to the degreasing mechanism. In the embodiment shown, the vacuum filter is coupled up to the suction line 63, by a branch pipe 69. The cylinder 70 of the vacuum filter, which may be externally covered in the usual manner by replaceable filter cloths or the like is rotated by any suitable means (not shown) within the semi-cylindrical tank 71. To this filter tank may be delivered either degreased sludges (without having passed through the intermediate centrifuging stage), such sludges being green sludge, aerated sludge, or combinations thereof; or, in accordance with the preferred embodiment as herein shown, the filter tank may receive the degreased effluent from a centrifugal sludge dewatering mechanism. As herein illustrated, the degreased effluent is delivered to the vacuum filter tank 71, from the degreasing mechanism, by way of take-off pipe 48, branch pipe 72 and valve 73.

The vacuum line 69 is conducted from the interior of the filter drum 70, through the axis thereof as shown, which is located below the level of the materials in the filter tank. As the filter drum 70 revolves in the direction of the arrow shown in Figure 4, the liquids are taken by suction through the porous walls thereof and carried out through the pipe 69, the remaining fine solids being carried on the periphery of the cylinder 70 to the scraper 74, which scrapes off said solids and discharges them upon a supplemental conveyor belt 75, which latter carried said solids upwardly and discharges them onto the main conveyor belt 21, for delivery to the incinerator, or other point of use, along with the solids from the centrifuge (when a centrifuge is employed in the system) and/or the greases from the degreasing tanks.

It may here be noted that the particular form of degreasing mechanism herein disclosed, considered independently of the other features of the system, may be employed to degrease the sludges directly, just as they come from the primary settling or aeration tanks through pipe 9, or from the thickener tank, or from a digestion system if such be used; or may be employed, as shown in this embodiment, to degrease the effluent which has been separated from the sludges by any suitable means, such as the centrifuge here employed. In any event, this specific degreasing mechanism seems to operate most advantageously when the materials delivered thereto have initially been aerated and agitated, either by the ordinary aeration tank (not shown) or by the turbulent aerating action of the centrifuge here employed. As an alternative or supplement to such aeration and agitation, means may be provided in association with the delivery pipe 19 leading to the degreasing mechanism, designed to agitate or aerate the materials immediately prior to delivery to the degreasing tank. For example, the pipe 19 (as shown in section in Figure 1) may have a spiral fin 76 positioned therein, serving to agitate the effluent passing therethrough on its way to the tank.

The aeration and agitation of the materials passing to the degreaser appear to result in the entrainment of bubbles of air along with the greases, which, as soon as the materials assume a relatively quiescent state in the open degreasing tank, aid in carrying the greases to the top surface where they are skimmed off.

From the foregoing detailed description, it will be evident how the various objects and advantages referred to in the fore part of this specification are attained by the present invention. It should be especially observed that while individual features or combinations of features have various specific advantages (mentioned during the course of the description), the complete lay-out, especially in the association shown, also has especial advantages, which may be summed up as follows: The thickening and controlled feeding of the sludges to the centrifuge improve the operation and increase the efficiency of the latter; the centrifuge effectively separates and dries the major portion of the sludges to the point where they will support their own combustion and acts to carry off the major portion of the liquids and greases together, in an agitated and aerated condition; this effluent is then separated, with a high degree of efficiency by the degreasing mechanism shown, from which the concentrated greases are discharged, preferably for recombining with the solids discharged from the centrifuge; the liquids from the degreaser are carried off, in whole or in large part, either for ultimate disposal, or more preferably for further refinement, which is accomplished by the vacuum filtration mechanism; the vacuum filter operates efficiently, because of the substantial degreasing of the materials before delivery thereto; and finally the solids from the vacuum filter are carried off for disposal, preferably along with the solids from the centrifuge and/or with the greases from the degreaser; the final clarified effluent from the vacuum filter being carried off alternatively to a stream or other point of disposal or reconveyed to the primary or other stages of the system for chemical treatment and/or resettling or recentrifuging.

All of the component parts of such a system are thus improved in their action and efficiency, and the greases instead of being a hindrance can be actually put to use.

I claim:

1. The method of treating sewage sludges and the like which comprises thickening the sludge and controllably feeding the same to centrifuging means, centrifugally separating therefrom the major portion of the solid components and aerating the more liquid components, thereafter separating the greasy elements from the latter, and filtering the remaining liquids.

2. The method of treating sewage sludges and the like which comprises thickening the sludge and controllably feeding the same to centrifuging means, centrifugally separating therefrom the major portion of the solid components and aerating the more liquid components, thereafter separating the greasy elements from the latter, filtering the remaining liquids, and burning the separated solids and greases.

3. In the treatment of sewage or analogous material, the steps of centrifuging the material to effect a separation into solids and effluent components and effecting aeration of the effluent and thereafter degreasing the aerated effluent.

4. In the treatment of sewage or analogous material, the steps of centrifuging the material to effect a separation into solids and effluent components and effecting aeration of the effluent, thereafter degreasing the aerated effluent, and subjecting the degreased effluent to vacuum filtration.

5. In a sewage disposal plant, a sludge treating system comprising mechanism for centrifuging the sludge to separate the major part of the solids from the more liquid materials therein, mechanism for degreasing the centrifuge effluent, and means for conveying the effluent from the centrifuging mechanism to the degreasing mechanism, said system including means for turbulently aerating the effluent delivered to the degreasing means.

6. The method of treating a greasy, aqueous sludge which comprises centrifugally separating from the heavier solids thereof a substantial part of the other components and aerating the latter as a mixture, and promptly after aeration effecting a quieting of said mixture to cause flotation of grease, and skimming off said grease while it is still in an aerated condition.

JOSEPH S. PECKER.